(12) United States Patent
Perry et al.

(10) Patent No.: US 12,736,499 B2
(45) **Date of Patent: *Sep. 15, 2026**

(54) CIRCUITRY FOR MEASUREMENT OF ELECTROCHEMICAL CELLS

(71) Applicant: Cirrus Logic International Semiconductor Ltd., Edinburgh (GB)

(72) Inventors: Ivan Perry, Penicuik (GB); John Priestley, Edinburgh (GB); Gordon J. Bates, Edinburgh (GB); Christos Giagkoulovits, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 561 days.

This patent is subject to a terminal disclaimer.

(21) Appl. No.: 18/306,438

(22) Filed: Apr. 25, 2023

(65) Prior Publication Data

US 2024/0302438 A1 Sep. 12, 2024

Related U.S. Application Data

(60) Provisional application No. 63/450,441, filed on Mar. 7, 2023.

(51) Int. Cl.
*G01N 27/416* (2006.01)
*G01N 27/26* (2006.01)
(Continued)

(52) U.S. Cl.
CPC ..... *G01N 27/4163* (2013.01); *G01N 27/4175* (2013.01); *G01N 27/26* (2013.01); *G01N 27/3274* (2013.01)

(58) Field of Classification Search
CPC ........... G01N 27/4163; G01N 27/4175; G01N 27/26; G01N 27/3274
See application file for complete search history.

(56) References Cited

U.S. PATENT DOCUMENTS

2018/0323750 A1 11/2018 Wang et al.
2021/0262977 A1 8/2021 Kanoun
(Continued)

FOREIGN PATENT DOCUMENTS

EP 3335033 B1 3/2020
WO 2017040235 A1 3/2017
WO WO-2020011652 A1 * 1/2020 ......... G01N 27/4175

OTHER PUBLICATIONS

Machine translation for WO-2020011652-A1, downloaded Jan. 26, 2026 (Year: 2026).*
(Continued)

*Primary Examiner* — John C Kuan
(74) *Attorney, Agent, or Firm* — Jackson Walker L.L.P.

(57) ABSTRACT

Circuitry, comprising: measurement circuitry having an input coupled to an electrode of an electrochemical cell and configured to convert an analyte signal at the electrode to an analog output signal; an ADC having an ADC input for receiving the analog output signal and configured to convert the analog output signal to a digital output signal; drive circuitry; and control circuitry operable in one or more of a calibration mode and a measurement mode. In the calibration mode, the drive circuitry applies a calibration signal at the input of the measurement circuitry, the control circuitry calibrates the measurement circuitry based on the analog or digital output signal responsive to the calibration signal. In the measurement mode, the drive circuitry applies an offset signal at the input of the measurement circuitry, the control circuitry controls the offset signal to maintain the analog or digital output signal within a threshold range.

28 Claims, 8 Drawing Sheets

(51) Int. Cl.
*G01N 27/327* (2006.01)
*G01N 27/417* (2006.01)

(56) References Cited

U.S. PATENT DOCUMENTS

| | | | | |
|---|---|---|---|---|
| 2023/0194451 | A1* | 6/2023 | Ligouras | G01N 33/4836 324/609 |
| 2023/0284926 | A1* | 9/2023 | Kanoun | H03F 3/187 |
| 2025/0283846 | A1* | 9/2025 | Tabassum | G01L 9/0083 |
| 2025/0334540 | A1* | 10/2025 | Soleymani | H04W 4/80 |

OTHER PUBLICATIONS

Reay et al., “An Integrated CMOS Potentiostat for Miniaturized Electroanalytical Instrumentation” ISSCC94 / SESSION 9 | Sensors and Display Electronics | Paper TA 9.5, IEEE 1994 (Year: 1994).*
International Search Report and Written Opinion of the International Searching Authority, International Application No. PCT/GB2024/050541, mailed May 13, 2024.

* cited by examiner

| Switches | Measurement | Calibration |
|---|---|---|
| A1, A4 | Closed | Open |
| A2, A3 | Open | Closed |

| Switches | Measurement | Calibration |
|---|---|---|
| A1, A4 | Closed | Open |
| A2, A3 | Open | Closed |

CIRCUITRY FOR MEASUREMENT OF ELECTROCHEMICAL CELLS

The present disclosure claims priority to U.S. Provisional Patent Application Ser. No. 63/450,441, filed Mar. 7, 2023, which is incorporated by reference herein in its entirety.

TECHNICAL FIELD

The present disclosure relates to circuitry for measuring characteristics in electrochemical cells.

BACKGROUND

Electrochemical sensors are widely used for the detection or characterisation of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response signal at one or more of the electrodes. The measured response signal can be processed to determine a concentration of an analyte.

Error can be introduced in the measured response, due to non-ideal effects at the electrochemical cell as well as sub-optimal conditions in circuitry used to measure the response.

SUMMARY

According to a first aspect of the disclosure, there is provided a circuitry for processing an analyte signal obtained from an electrochemical cell, the circuitry comprising: measurement circuitry having a first input coupled to a first electrode of the electrochemical cell, the measurement circuitry configured to convert the analyte signal at the first electrode to a first analog output signal; a first analog-to-digital converter (ADC) having an first ADC input for receiving the first analog output signal, the first ADC configured to convert the first analog output signal to a first digital output signal at a first ADC output; drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, and wherein, in the measurement mode, the drive circuitry is configured to apply an offset signal at the first input of the measurement circuitry, the control circuitry configured to control the offset signal to maintain the first analog output signal or the first digital output signal within a threshold range.

The measurement circuitry may comprise a transimpedance amplifier. The transimpedance amplifier may comprise: a gain stage coupled between the first input and the first ADC; and a feedback resistor coupled between the first input and the first ADC.

The measurement circuitry may comprise a current conveyer.

The circuitry may further comprise: a second ADC having a second ADC input, wherein the first ADC has a higher bandwidth than the second ADC.

The second ADC may be configured to receive the first analog output signal at the second ADC input and convert the first analog output signal to a second digital output signal at a second ADC output. The first ADC input and the second ADC input may be switchably coupled to the measurement circuitry.

The second ADC may be configured to convert the analyte signal at the first electrode to a second analog output signal. The second ADC may be configured to receive the second analog output signal and convert the second analog output signal to a second digital output signal at a second ADC output.

Calibration of the measurement circuitry may comprise adjusting a gain of the measurement circuitry.

Calibration of the measurement circuitry may comprise setting or adjusting the offset signal used in the measurement mode.

The calibration signal may be swept over a range of amplitudes.

In the measurement mode, the measurement circuitry may be configured to apply a fixed gain to the analyte signal.

The control circuitry may be configured to monitor the analog output signal or the digital output signal and control the offset signal based on the analog output signal or the digital output signal.

The drive circuitry may comprise a digital-to-analog converter (DAC). The DAC may have a DAC output coupled to the first input of the measurement circuitry.

The control circuitry may be configured to control the offset signal in response to the analog output signal exceeding the value of a least significant bit (LSB) of the DAC.

The DAC may be a current DAC. In which case, the calibration signal may be a calibration current.

The circuitry may further comprise switching circuitry configured to selectively couple the first input of the measurement circuitry the first electrode to the first electrode. The switching circuitry may be controllable by the control circuitry. The drive circuitry may further comprise a guard amplifier having a guard amplifier output. During the calibration mode, the switching circuitry may be controllable by the control circuitry to selectively couple the first electrode to guard amplifier output. The switching circuitry may be configured to selectively couple the DAC output to the first input of the measurement circuitry and to selectively couple the DAC output to the guard amplifier output.

During the calibration mode, the control circuitry may be configured to control the switching circuitry to couple the DAC output to the first input of the measurement circuitry. During the measurement mode, the control circuitry may be configured to control the switching circuitry to couple the guard amplifier output to the first electrode.

The drive circuitry may further comprise a first current mirror configured to mirror a first output current of the guard amplifier, the first current mirror having a first current mirror output selectively coupled to the DAC output via the switching circuitry; and a second current mirror configured to mirror a second output current of the measurement circuitry, the second current mirror having a second current mirror output selectively coupled to the guard amplifier output via the switching circuitry. During the calibration mode, the control circuitry may be configured to control the switching circuitry to couple the second current mirror output to the guard amplifier output. During the measurement mode, the control circuitry is configured to control the switching circuitry to couple the first current mirror output to the DAC output.

According to another aspect of the disclosure, there is provided a system comprising the circuitry as described above and the electrochemical cell. The electrochemical cell may comprise a counter electrode and the first electrode may be a first working electrode of the electrochemical cell. The electrochemical cell may comprise a second working electrode.

The electrochemical cell may comprise an anode and a cathode. The first electrode may be the cathode.

According to another aspect of the disclosure, there is provided an electronic device comprising the circuitry or system described above. The electronic device may comprise a continuous glucose monitor. Additionally or alternatively, the electronic device may comprise one of a mobile computing device, a laptop computer, a tablet computer, a games console, a remote control device, a home automation controller or a domestic appliance, a toy, a robot, an audio player, a video player, or a mobile telephone, and a smartphone.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to the measurement of signals (such as analyte signals) in electrochemical cells.

Figure 1:
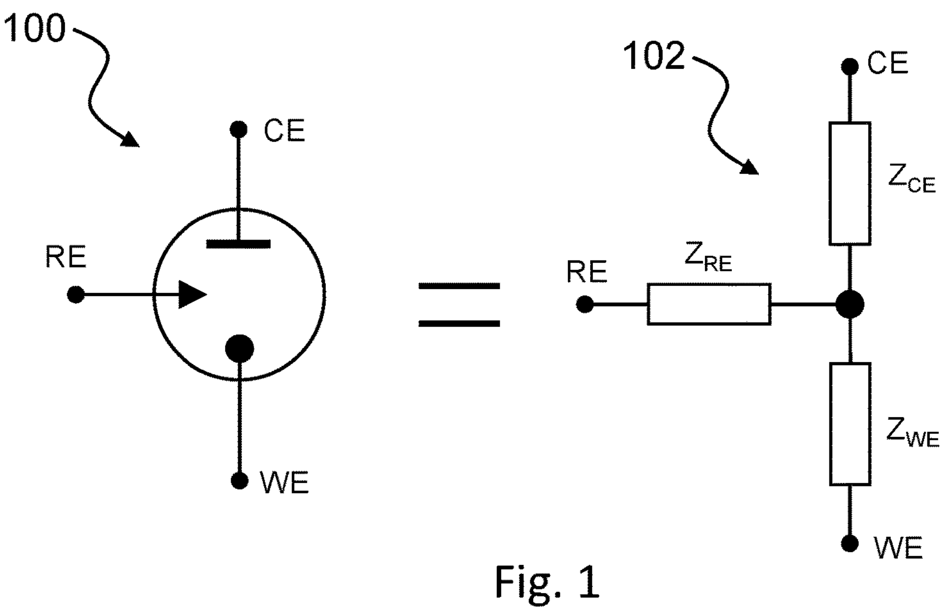
FIG. 1 illustrates a schematic diagram and electrical equivalent circuit for a three-electrode electrochemical cell.

FIG. 1 is a schematic diagram of an electrochemical cell 100 comprising three electrodes, namely a counter electrode CE, a working electrode WE and a reference electrode RE. FIG. 1 also shows an equivalent circuit 102 for the electrochemical cell comprising a counter electrode impedance ZCE, a working electrode impedance ZWE and a reference electrode impedance ZRE.

To determine a characteristic of the electrochemical cell, and therefore an analyte concentration, a bias voltage is applied at the counter electrode CE and a current at the working electrode WE is measured. Feedback is used to set the voltage VRE at the reference electrode RE to be equal to a bias voltage VBIAS1 (as is explained in more detail below) A current IWE at the working electrode WE is then measured. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, a characteristic of the analyte contained in the cell 100 can be ascertained.

Figure 2:
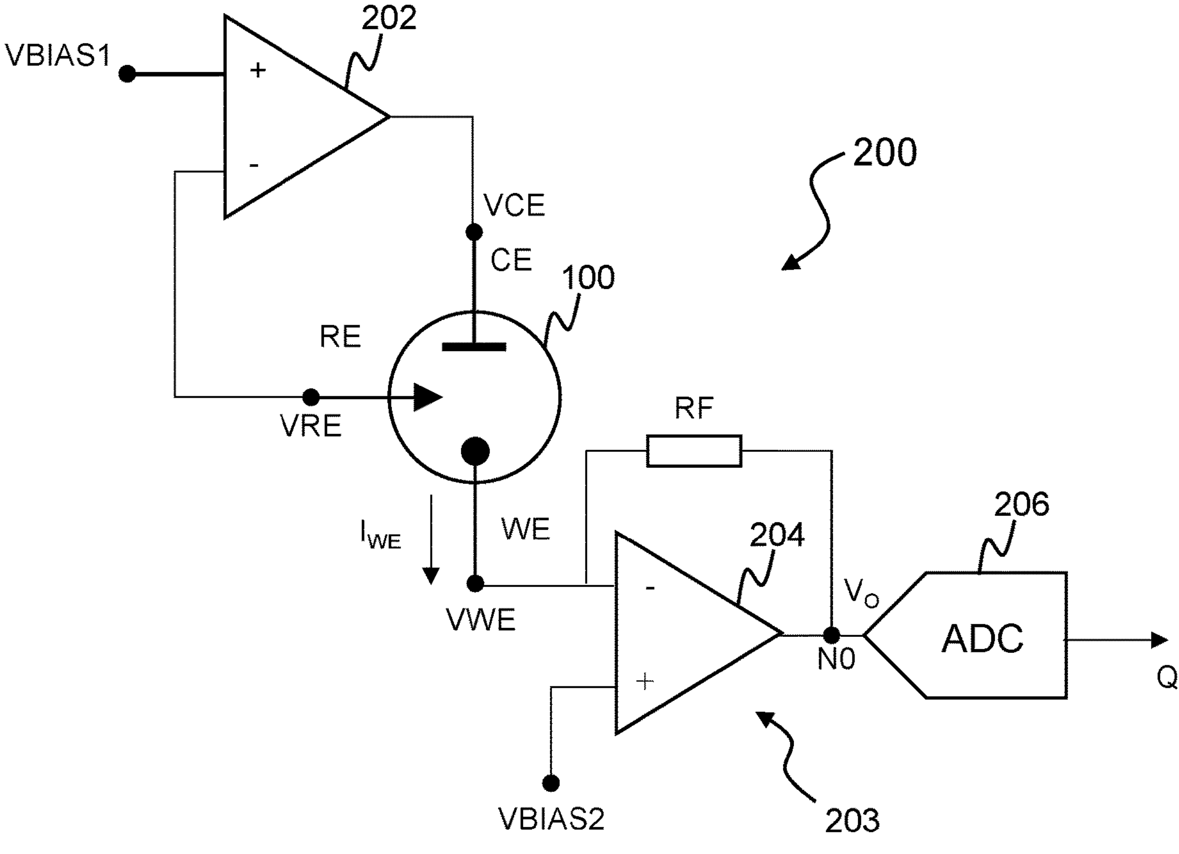
FIG. 2 is a schematic diagram of an example prior art measurement circuit.

FIG. 2 illustrates an example prior art drive and measurement circuit 200 which is configured to implement the above explained cell characterisation, specifically for measuring an analyte concentration in the electrochemical cell 100 shown in FIG. 1. The circuit 200 comprises a first amplifier 202 and a gain stage 203 comprising a second amplifier 204 and a feedback resistor RF. Each of the first and second amplifiers 202, 204 may comprise one or more op-amps. A non-inverting input of the first amplifier 202 is coupled to a bias voltage VBIAS1. An inverting input of the first amplifier 202 is coupled to the reference electrode RE. An output of the first amplifier 202 is coupled to the counter electrode CE and configured to drive the counter electrode CE with a counter electrode bias voltage VICE. The counter electrode bias voltage VCE applied at the counter electrode CE by the first amplifier 202 is proportional to the difference between the bias voltage VBIAS1 and the voltage VRE at the reference electrode RE. As such, the first amplifier 202 acts to maintain the voltage at the reference electrode RE at the bias voltage VBIAS1.

An inverting input of the second amplifier 204 is coupled to the working electrode WE and the non-inverting input of the second amplifier 204 is coupled to a reference voltage, VBIAS2. VBIAS2 may be set to a constant reference voltage, such as half the supply voltage of the circuit 200 (i.e., VDD/2). Alternatively, VBIAS2 may be variable. By controlling the bias voltage VBIAS1 and the reference voltage VBIAS2, a differential bias voltage between the working and reference electrodes WE, RE can be controlled. A feedback loop comprising a feedback resistor RF is coupled between the inverting input and an output of the second amplifier 204. As such, the gain stage 203 operates as a transimpedance amplifier (TIA). The feedback serves to maintain the working electrode WE at the reference voltage VBIAS2 provided at the non-inverting input of the second amplifier 204. The gain stage 203 is thus operable to output an output voltage VO at an output node NO which is proportional to the current IWE at the working electrode WE. The output voltage VO is then provided to an analog-to-digital converter (ADC) 206 which outputs a digital output Q which represents the current IWE at the working electrode WE. As will be explained in more detail below, alternative gain arrangements to that shown in FIG. 2 exists for processing the working electrode current IWE. The arrangements shown in FIG. 2 is provided for example only.

To bias the counter electrode CE, and therefore the electrochemical cell 100, at different voltages, the bias voltage VBIAS1 may be adjusted, for example between ground (e.g. zero volts) and the supply voltage VDD. As an example, with the non-inverting input voltage VBIAS2 of the second amplifier 204 set at VDD/2, a positive bias may be applied to the cell 100 by maintaining the bias voltage VBIAS1 above VDD/2. Likewise, a negative bias may be applied to the cell 100 by maintaining the bias voltage VBIAS1 below VDD/2. Additionally or alternatively to varying the bias voltage VBIAS1, the reference voltage VBIAS2 may be adjusted to set the voltage at the working electrode WE, and therefore the electrochemical cell 100.

It will be appreciated that the ADC 206 has a finite dynamic range and fluctuations in the working electrode current IWE may cause the output voltage VO provided to the ADC 206 to fall outside of this dynamic range. To prevent the output voltage VO provided at the input of the ADC 206 extending outside of this dynamic range, adjustments can be made to the circuit 200. For example, the gain of the second amplifier 204 can be varied, for example by varying the resistance of the feedback resistor RF. However, such adjustments can lead to non-linearity of measurement.

Instead of adjusting the gain in the signal path between the working electrode WE and the ADC 206, an offset current can be injected into the signal path, for example at the working electrode WE.

Figure 3:
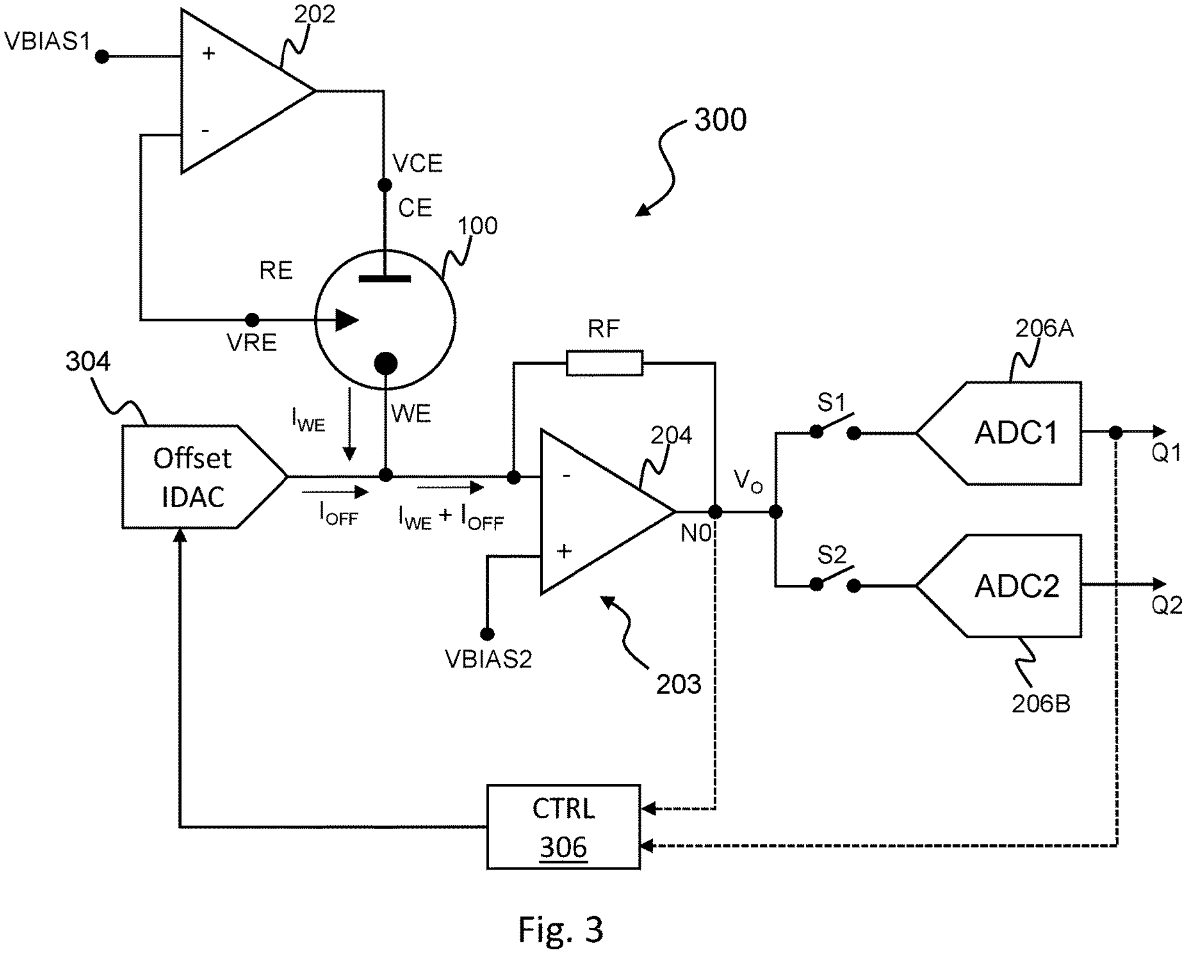
FIG. 3 is a schematic diagram of a measurement circuit for measuring characteristics of an electrochemical cell.

FIG. 3 illustrates an example drive and measurement circuit 300 according to embodiments of the present disclosure which implements such offset current injection. Like parts of the circuit 300 which are common to the circuit 200 of FIG. 2 have been denoted like numbering. As such, like the circuit 200 of FIG. 2, the circuit 300 shown in FIG. 3 comprises the electrochemical cell 100, the first amplifier 202 and the gain stage 203. In place of the single ADC 206, first and second ADCs 206A, 206B are provided, each having an input coupled to an output node NO of the gain stage 203, optionally via respective first and second switches S1, S2.

As with the circuit 200 of FIG. 2, the gain stage 203 is configured to output an output voltage VO at its output node NO. This output voltage VO is provided to an input of each of the first and second ADCs 206A, 206B which, in turn, each output a respective digital output Q1, Q2. The first and second ADCs 206A, 206B may be configured with different operating characteristics. For example, the first and second ADCs 206A, 206B may operate at different sampling frequencies. This may have particular application if the electrochemical cell 100 is required to be driven with a variety of AC and/or DC stimuli, such as in one or more measurement or calibration modes. For example, in a measurement mode in which a characteristic of an analyte in the cell 100 is being measured, changes in the characteristic of the analyte will likely be relatively slow (e.g., near DC). In which case, the measured output voltage VO will change slowly and can be measured with a low sampling frequency. For example, one of the first and second ADCs 206A, 206B may be configured to operate with a low sampling frequency. In another example, in a calibration mode in which the cell 100 is being calibrated, a high frequency stimulus (such as a chirp) may be applied to an electrode of the cell 100. In turn, a measured output voltage VO is also likely to have high frequency content, such content requiring a high ADC sampling frequency to be measured. One of the first and second ADCs 206A, 206B may therefore be configured with a high sampling frequency.

Whilst two ADCs 206A, 206B are provided in the circuit 300, in other embodiments, only one ADC may be provided, such as in the arrangement shown in FIG. 2.

The circuit 300 further comprises a current digital-to-analog converter (IDAC) 304 and control circuitry 306 configured to control the IDAC 304. Whilst the IDAC 304 is provided in the circuit 300 of FIG. 3, in other embodiments, other drive circuitry operable to inject current at the working electrode WE may be employed. The IDAC 304 is configured to inject an offset current IOFF at the working electrode WE.

The control circuitry 306 is configured to control the level of the offset current IOFF injected by the IDAC 304. The control circuitry 306 may be configured to monitor the output voltage VO output from the gain stage 203. Additionally or alternatively, the control circuitry 306 may be configured to monitor the first and/or second digital outputs Q1, Q2 output from the first and/or second ADCs 206A, 206B.

There are several advantages associated with the injection of an offset current IOFF as described above. Firstly, the need for variable gain in the signal path between the working electrode WE the ADC 206 is obfuscated. Instead, the offset current IOFF can be controlled to maintain the current provide to the gain stage 203 and/or the output voltage VO within an acceptable range. In addition, current flow through the gain stage 203 can be reduced or minimized. Doing so may in turn lead to an improvement in the linearity of operation of the gain stage 203. For example, for the gain stage 203 shown in FIG. 3 which implemented as a TIA, swings or fluctuations in the output voltage VO can be minimised thereby improving the performance of the gain stage 203.

As such, the control circuitry 306 may control the IDAC 304 to vary the level of offset current IOFF based on one or both of the output voltage VO and the digital output(s) Q1, Q2. For example, the control circuit 306 may control the offset current IOFF to adjust the current injected into the gain stage 203 into a current range which maintains the output voltage VO from the gain stage 203 within a range suitable for conversion by the ADC 206. Monitoring of the output voltage VO and/or digital outputs Q1, Q2 as well as updating of the offset current IOFF may be continuous or periodic. For example, the offset current IOFF may be preset (e.g., based on measurements taken during a calibration phase). Then, after a predetermined period of time, the output voltage VO and/or digital outputs Q1, Q2 may be monitored by the control circuitry 306 to determine whether they are within an acceptable predetermined range. If it is determined that the measured response (VO/Q1/Q2) is outside the acceptable predetermined range, then the control circuitry 306 may control the offset IDAC 304 to adjust the offset current IOFF to bring the measured response back within the acceptable predetermine range.

It will be appreciated that injection of the offset current IOFF will lead to a change in the measured digital output Q. In such cases, the measured digital output Q will not be a true representation of the working electrode current IWE. However, the working electrode current IWE can be ascertained with knowledge of the injected offset current IOFF and the output voltage VO. Such processing may occur downstream by processing circuitry (not shown).

It will be appreciated that whilst the gain stage 203 of the circuit 300 in FIG. 3 is a TIA (formed by the second amplifier 204 and the feedback resistor RF), embodiments of the present disclosure are not limited to such an arrangement and any suitable gain circuit may be implemented in place of the transimpedance gain stage 203.

It has been found that offset current injection has particular advantages when considering an implementation of gain using a current conveyor.

Figure 4:
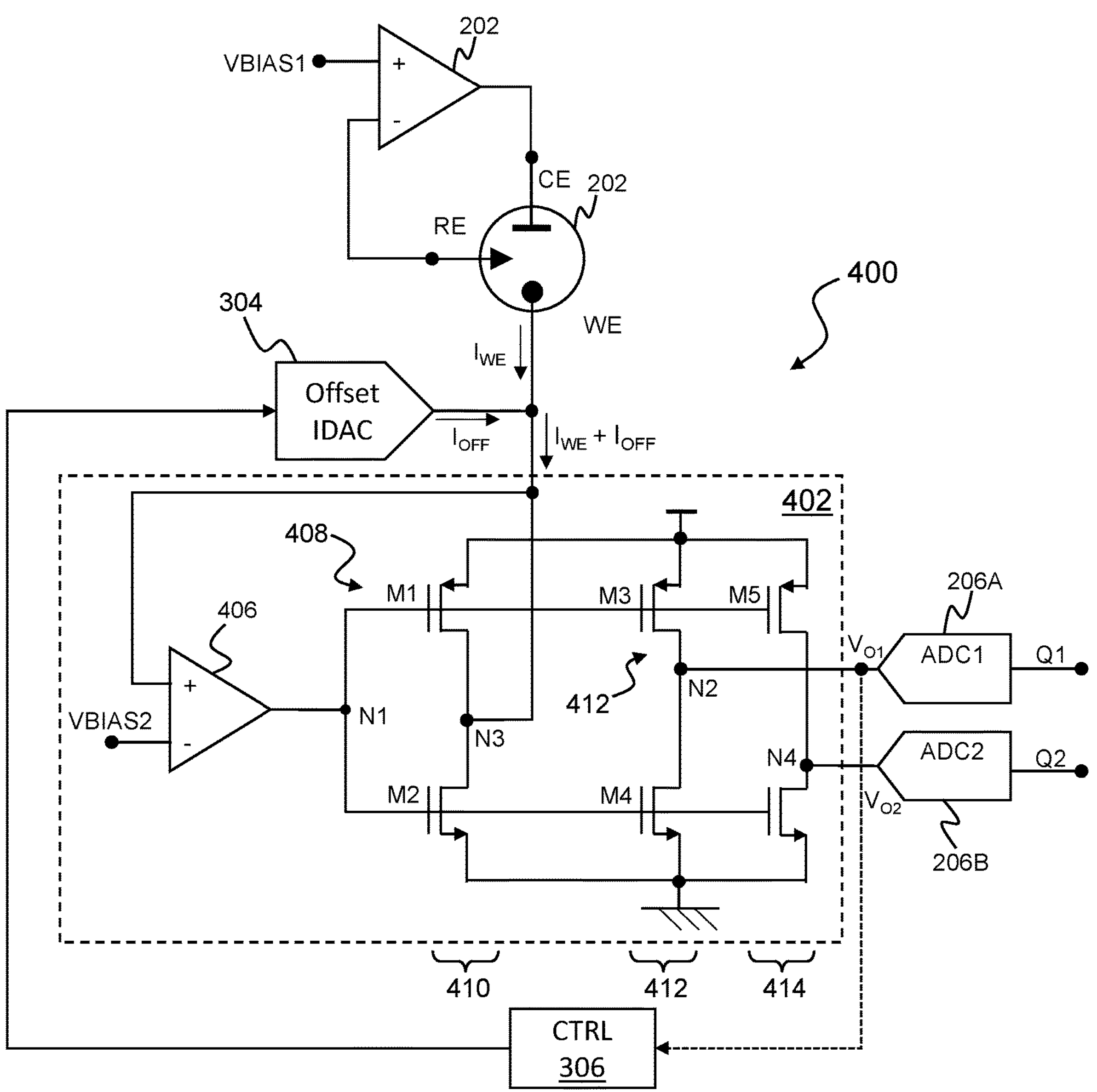
FIG. 4 is a schematic diagram of a measurement circuit for measuring characteristics of an electrochemical cell.

FIG. 4 illustrates the circuit 300 of FIG. 3, in which the gain stage 203 has been replaced with a gain stage 402 in the form of a current conveyor. Like parts of the Like the circuit 300 shown in FIG. 3, the first and second ADCs 206A, 206B are provided. However, instead of outputting a single output voltage VO like the gain stage 203 of the circuit 300, the gain stage 402 of the circuit 400 is configured to output first and second output voltage VO1, VO2. In this example, the gain stage 402 is implemented as a second generation current conveyor (CCII) although other current conveyor topologies could be implemented without departing from the scope of the present disclosure.

The measurement circuit 203 comprises a second amplifier 406 (e.g., an operational amplifier) and current mirror circuitry 408 comprising an output stage 410 and first and second current mirrors 412, 414. The output stage 410 comprises first and second transistors M1, M2. The first current mirror 412 comprise third and fourth transistors M3, M4. The second current mirror 414 comprises fifth and sixth transistors. In this example, the transistors M1:M6 are MOSFETs. Specifically, the first, third and fifth transistors M1, M3, M5 are PMOS devices and the second, fourth and sixth transistors M2, M4, M6 are NMOS devices.

The second amplifier 406 comprises a non-inverting input coupled to the working electrode WE, an inverting input coupled to a reference voltage VBIAS2, and an output coupled to a first (intermediate) node N1.

Gates of each of the first, second, third, fourth, fifth and sixth transistors M1:M6 are coupled to the first node N1 and therefore the output of the second amplifier 406. Drains of the first, third and fifth transistor M1, M3, M5 are coupled to a supply voltage VDD. Sources of the first, third and fifth transistors M1, M3, M5 are coupled to drains of the second, fourth and sixth transistors M2, M4, M6 respectively. Sources of the second, fourth and sixth transistors M2, M4 are coupled to a ground reference voltage (GND). The source of the third transistor M3 and the drain of the fourth transistor M4 are coupled at a second (output) node N2 to an input of the first ADC 206A. The source of the first transistor M1 and the drain of the second transistor M2 are coupled at a third node N3 to the working electrode WE. The source of the fifth transistor M5 and the drain of the sixth transistor M6 are coupled at a fourth node N4 to an input of the second ADC 206B. As such, a feedback path is provided between the third node N3 and the non-inverting input of the second amplifier 406. The amplifier 406 is thus arranged as a unity gain amplifier or buffer amplifier. The first and second transistors M1, M2 form the output stage 410, the current at the first node N1 output at the third node N3 which is fed back to the non-inverting input of the second amplifier 406. The third and fourth transistors M3, M4 form the first current mirror 412, the current at the first node N1 mirrored at the second node N2. The fifth and sixth transistors M5, M6 form the second current mirror 414, the current at the first node N1 mirrored at the fourth node N4.

As is explained in more detail above with reference to the circuit 300 of FIG. 3, the first and second ADCs 206A, 206B may be configured to operate at different sampling frequencies so as to be sensitive to signals at different frequencies. For example, the first ADC 206A may operate at a higher sampling frequency than the second ADC 206B. Additionally or alternatively, the first and second ADCs 206A, 206B may be configured with different dynamic ranges. Additionally or alternatively, the first and second current mirrors 412, 414 may be configured with different mirror ratios to account for different values of the combined current WE+IOFF.

During operation, the combined current WE+IOFF of the working electrode current IWE and the offset current IOFF is provided to the second amplifier 406 and this current IWE+IOFF is amplified by unity and therefore buffered to the first node N1. The current at the first node N1 is then conveyed by the first and second current mirrors 412, 414 to respective second and fourth nodes N2, N4 as the first and second output voltage VO1, VO2. These output voltage VO1, VO2 are provided to respective first and second ADCs 206A, 206B for conversion to first and second digital outputs Q1, Q2.

The control circuitry 306 may be configured to set the offset current IOFF injected by the IDAC 304 based on the first and/or second output voltages VO1, VO2 measured at the input to the ADC 206. Additionally, or alternatively, the offset current IOFF may be set based on the first and/or second digital outputs Q1, Q2.

Current conveyor architectures such as that shown on FIG. 4 can provide an advantage of minimizing output impedance at each of the counter, reference and working electrodes CE, RE, CE. This is in part due to the working electrode WE being driven directly by the output of the second amplifier 406. Since the load across the electrochemical cell 100 is highly capacitive in nature, this inherent low output impedance may be advantageous when a stimulus of high amplitude and/or frequency is driven over the electrochemical cell 100.

A drawback of such current conveyor architectures is that any mismatch in gain between the output stage 410 and respective first and second current mirrors 412, 414 can lead to errors in the output voltage VO, such as DC offset error, non-linearity, gain error and additive noise. Errors associated with such current conveyor implementations of the gain stage 402 can be minimized by operating the current conveyor with minimal signal current, so as to allow the gain stage 402 to tend towards its small signal equivalent circuit and thus its behaviour will tend towards ideal small signal behaviour.

Hence, signal current through the gain stage 402 (and the gain stage 203) can be minimized in a measurement mode by injecting an appropriate offset current IOFF at the working electrode WE. The offset current IOFF can be tuned so as to operate the gain stages 203, 402 with reduced output signal range (for example minimizing the first and/or second voltage VO1, VO2 where possible). By reducing voltage swings in the first and/or second output voltage VO1, VO2, the gain stages 203, 402 can be designed with a smaller dynamic range requirements, which may lead to a simplified design and/or reduced power consumption of the gain stages 203, 402. In the example shown in FIG. 4, this means that the gain stage 402 may be implemented with fewer current mirrors than would otherwise be required to service the entire range of the working electrode current IWE without injected offset current IOFF. For example, the second current mirror 414 and the second ADC 206B could be omitted altogether. Additionally or alternatively, current mirror ratioing need not be implemented. In conventional approaches, depending on the range of working electrode current IWE, multiple current mirrors may be provided, each with a different conversion ratio, the combination of current mirrors servicing the range of the working electrode current IWE. As such, the mirroring ratios of the first and second current mirrors 412, 414 may be substantially equal.

As noted above, the control circuitry may be configured during measurement of characteristics of the cell 100 to adjust the offset current IOFF so as to maintain the output voltage VO (circuit 300), the output voltages VO1, VO2 (circuit 400) and/or the digital outputs Q1, Q2 (circuits 300, 400) within a threshold voltage range or digital value range. For example, such a range may be within a threshold of zero volts or within a threshold range of zero of a predetermined non-zero voltage.

The inventors have realised that in both cases described above (with reference to FIGS. 3 and 4), the IDAC 304 (or other drive circuitry) may be used not only during a measurement mode to maintain signal levels within acceptable ranges, but also during calibration to inject calibration signals for calibrating the gain stages 203, 402 and/or the ADCs 206A, 206B.

In a calibration mode, the control circuitry 306 may be configured to inject a known calibration signal using the offset IDAC and measure a response to the calibration signal. The calibration signal may be in the form of a DC bias, an AC signal, or a mixture of AC and DC signals. For example, the calibration signal may be in the form of a chirp. The measured response may be obtained from the output voltage(s) VO, VO1, VO2, or the digital outputs Q1, Q2. The measured response may then be used to calibrate the circuit 300, 400.

In a measurement mode, the control circuitry 306 may be configured to inject the offset current IOFF as has been described above with reference to both of FIGS. 3 and 4.

Embodiments above are described with reference to a three-electrode cell 100 comprising a counter electrode CE, a working electrode WE and a reference electrode RE. Embodiments of the disclosure are not, however, limited to having three-electrodes. The concepts described herein are equally applicable to two-electrode cells. In particular, in any of the embodiments described above, the three-electrode cell 100 may be replaced with a two-electrode cell.

Figure 5:
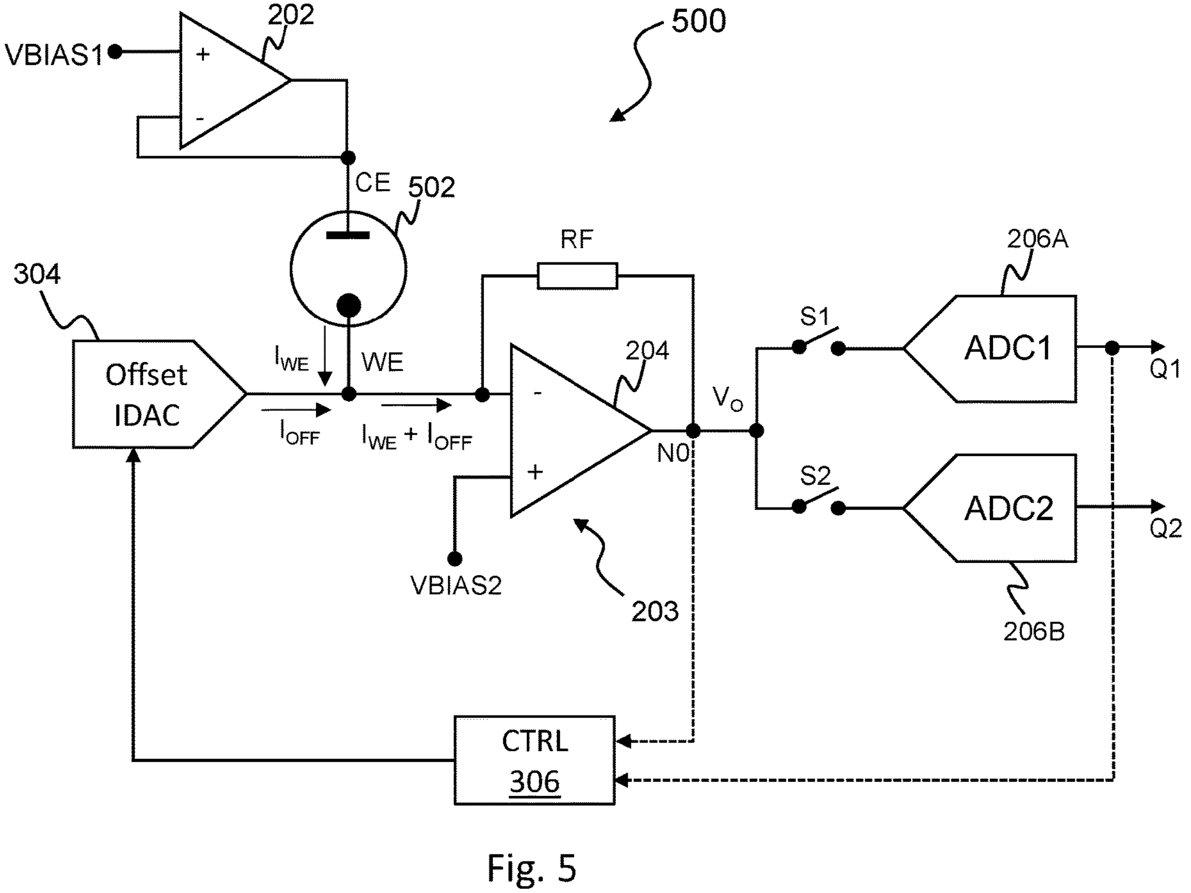
FIG. 5 is a schematic diagram of a measurement circuit for measuring characteristics of an electrochemical cell.

FIG. 5 is an example drive and measurement circuit 500 which is a variation of the circuit 300 shown in FIG. 3, like parts having been given like numbering. In the circuit 500, the cell 100 has been replaced with a two-electrode cell 502. The counter electrode CE of the cell 502 is coupled to the output of the first amplifier 202. The working electrode WE of the cell 502 is coupled to the non-inverting input of the second amplifier 204. The inverting input of the first amplifier 202 is coupled to the counter electrode CE of the cell 502. This is contrast to the arrangement in FIG. 3 in which the inverting input of the first amplifier 202 is coupled to the reference electrode RE of the cell 100.

Embodiments are described above with reference to cells 100, 502 comprising a single counter electrode CE and a single a working electrode WE. Embodiments of the disclosure are not, however, limited to having cells having only one counter electrode or only one working electrode. The concepts described herein are equally applicable to cells comprising multiple working electrodes or multiple counter electrodes. In doing so, such sensors may either providing redundancy or enabling the sensing of multiple analytes in a single chip. This may be particularly advantageous in applications such as continuous glucose monitoring, where it may be desirable to measure concentrations of several analytes including but not limited to two or more of glucose, ketones, oxygen, lactate, and the like.

Figure 6:
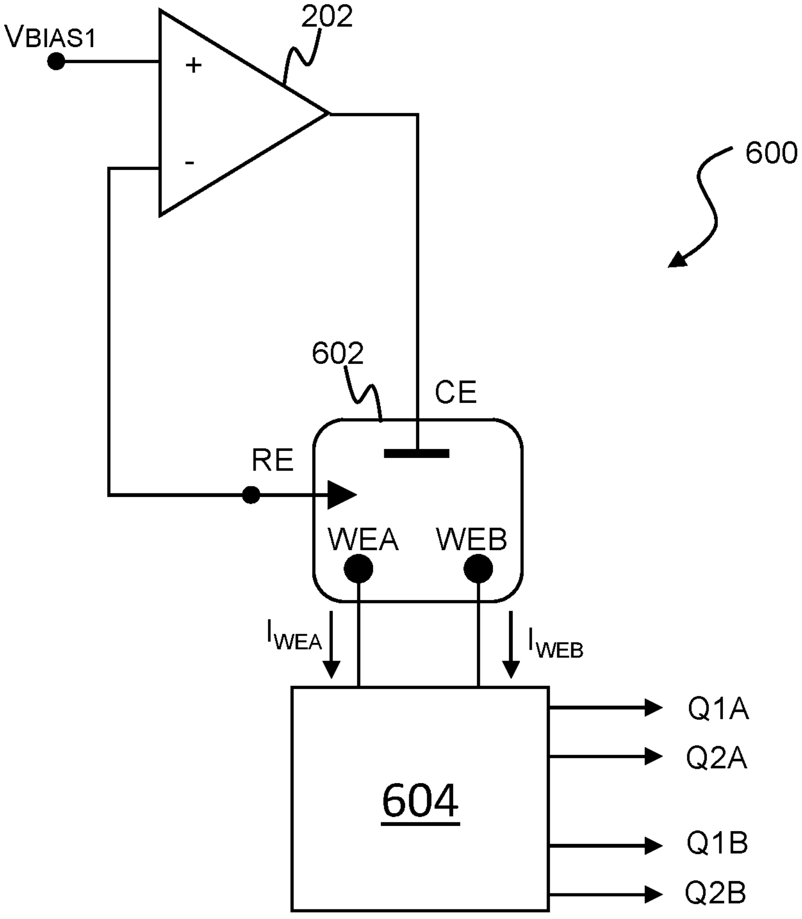
FIG. 6 is a schematic diagram of a measurement circuit for measuring characteristics of an electrochemical cell.

FIG. 6 illustrates an example drive and measurement circuit 600. Where like parts have been given like numbering. In the circuit 600, an electrochemical cell 602 comprising first and second working electrode WEA, WEB, a counter electrode CE and a reference electrode RE. A measurement circuit 604 is provided which outputs first and second digital output signals Q1A, Q2A based on a current IWEA derived from the first working electrode WEA and outputs first and second digital output signals Q1B, Q2B based on a current IWEB derived from the second working electrode WEB. The measurement circuit 604 may, for example, comprise two processing channels, each processing channel implementing the circuitry shown in FIG. 3 or 4. Alternatively, the measurement circuit may be implemented using a single processing stream multiplexed by a multiplexer (not shown). In either case, the measurement circuit 604 may be operable to hold the first and second working electrodes WEA, WEB at different voltages. This may be particularly useful when measuring different analytes with the first and second working electrodes WEA, WEB.

In the embodiments described above, in a measurement mode, an offset current IOFF is injected at the working electrode WE to control the DC offset in the output voltage VO output form the gain stage 203. As noted above, by controlling the DC offset, operation of the gain stage 203 can be maintained within a range acceptable for measuring signal amplitude at the working electrode, i.e. the working electrode current IWE.

It will also be appreciated that the provision of a constant uninterrupted voltage bias over the cells 100, 502 described herein is advantageous. Any transient pulses, glitches or changes in the voltage bias across the cells 100, 502 can result in significant disruption to output current accuracy of from the various circuitry 300, 400, 500. Such transients manifest as an output current that no longer reflects the concentration of an analyte in the cells 101, 502. Even relatively short transients can exhibit relatively long time constants, leading to measurement disruption over an extended period of time.

An example of a process which can introduce transients in voltage and/or current at the working electrode WE of the cells 100, 502 described herein is autozeroing. Autozeroing may be used to null any offset drift within a measurement path. During a calibration or autozeroing mode, a DC offset of the measurement path can be measured at the output of the first ADC 206A.

Figure 7:
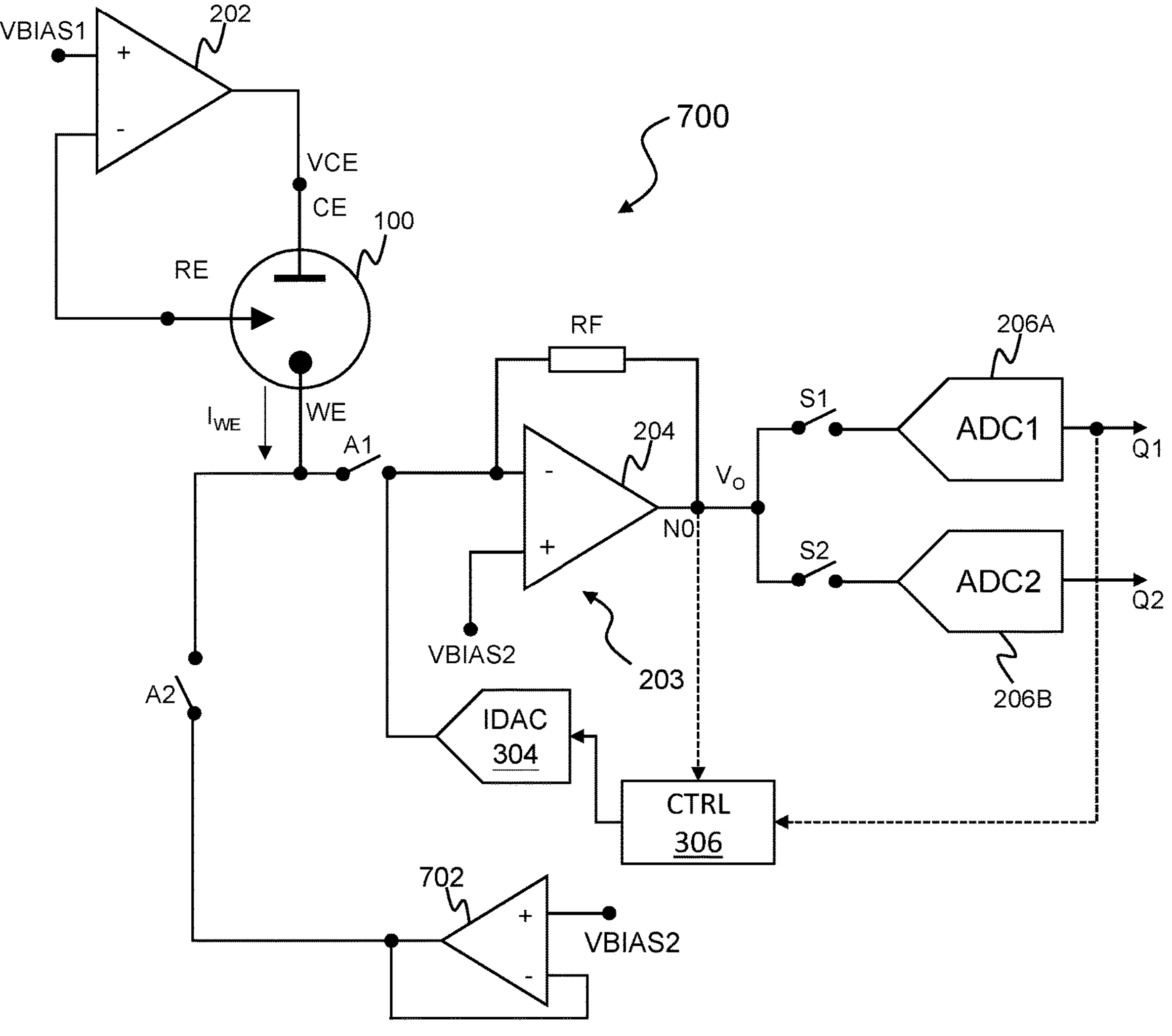
FIG. 7 illustrates an example drive and measurement circuit which is a variation of the drive and measurement circuit shown in FIG. 3.

FIG. 7 illustrates an example drive and measurement circuit 700 according to embodiments of the present disclosure which is a variation of the drive and measurement circuit 300 shown in FIG. 3, like parts having been given like numbering. In addition to the components provided in the circuit 300 of FIG. 3, the circuit 700 of FIG. 7 further comprises a working electrode (WE) guard amplifier 072 and first and second autozero switches A1, A2 are provided to allow isolation of the gain stage 203. The first autozero switch A1 is provided between the working electrode and the non-inverting input of the gain stage 203. The IDAC 304 is coupled to the side of the first autozero switch A1 coupled to the gain stage 203. When the first autozero switch A1 is open, the working electrode WE is isolated from the gain stage 203. The second autozero switch A2 is coupled between an output of the WE guard amplifier 702 and the working electrode WE. When the second autozero switch A2 is open, the working electrode WE is isolated from the WE guard amplifier 702.

In a measurement mode, the first autozero switch A1 is closed and the second autozero switch A2 open such that the working electrode WE is coupled to the gain stage 203. To transition the circuit 700 to a calibration mode, the first autozero switch S3 is opened and the second autozero switch A2 is closed, thus disconnecting the working electrode WE from the gain stage 203 and connecting the working electrode WE to the WE guard amplifier which acts to maintain the working electrode voltage VWE at the working electrode WE at the same level as it was in the measurement mode before switching to the calibration mode, as well as providing a current path for the working electrode current IWE. This allows for a substantially uninterrupted bias voltage over the cell 100 while the DC offset of the measurement path (comprising the gain stage 203 and the ADCs 206A, 206B) is being measured at the output(s) Q1, Q2.

An implementation issue with this scheme is that, during transition between measurement and autozeroing modes, the working electrode current IWE is instantaneously switched from sinking to the gain stage 203 to sinking to the WE guard amplifier 702. In practice, this can create a step change in the load demand for both the gain stage 203 and the WE guard amplifier 702, resulting in a transient voltage at the working electrode WE whilst current through the guard amplifier 702 increases to a new current load, i.e., the working electrode current IWE. The duration of this "catch up" undertaken by the WE guard amplifier 702 depends on the internal slew rate of the WE guard amplifier 702. A similar step change in load demand for the gain stage 203 and the WE guard amplifier 702 is created during a transition from the calibration mode to the measurement mode when the load (IWE) is switched from the WE guard amplifier 702 to the gain stage 202. These step changes in load demand can lead to a short-term change in the bias voltage across the cell 100. This change in bias voltage is undesirable for the reasons discussed above.

Embodiments of the present disclosure aim to address or at least ameliorate problems associated with such switching by utilising one or more components already present in the drive and measurement circuit 700.

In one example, the IDAC 304 which is provided for gain calibration may be used to pre-load the WE guard amplifier 702 and/or the gain stage 203 with a known current, such as the working electrode current IWE. In doing so, voltage transients associated with such pre-loading will occur substantially prior to connection of the WE guard amplifier 702 and/or the gain stage 203 to the working electrode WE, thereby significantly reducing signal artefacts at the working electrode WE associated with a transition between measurement and autozeroing modes.

Figure 8:
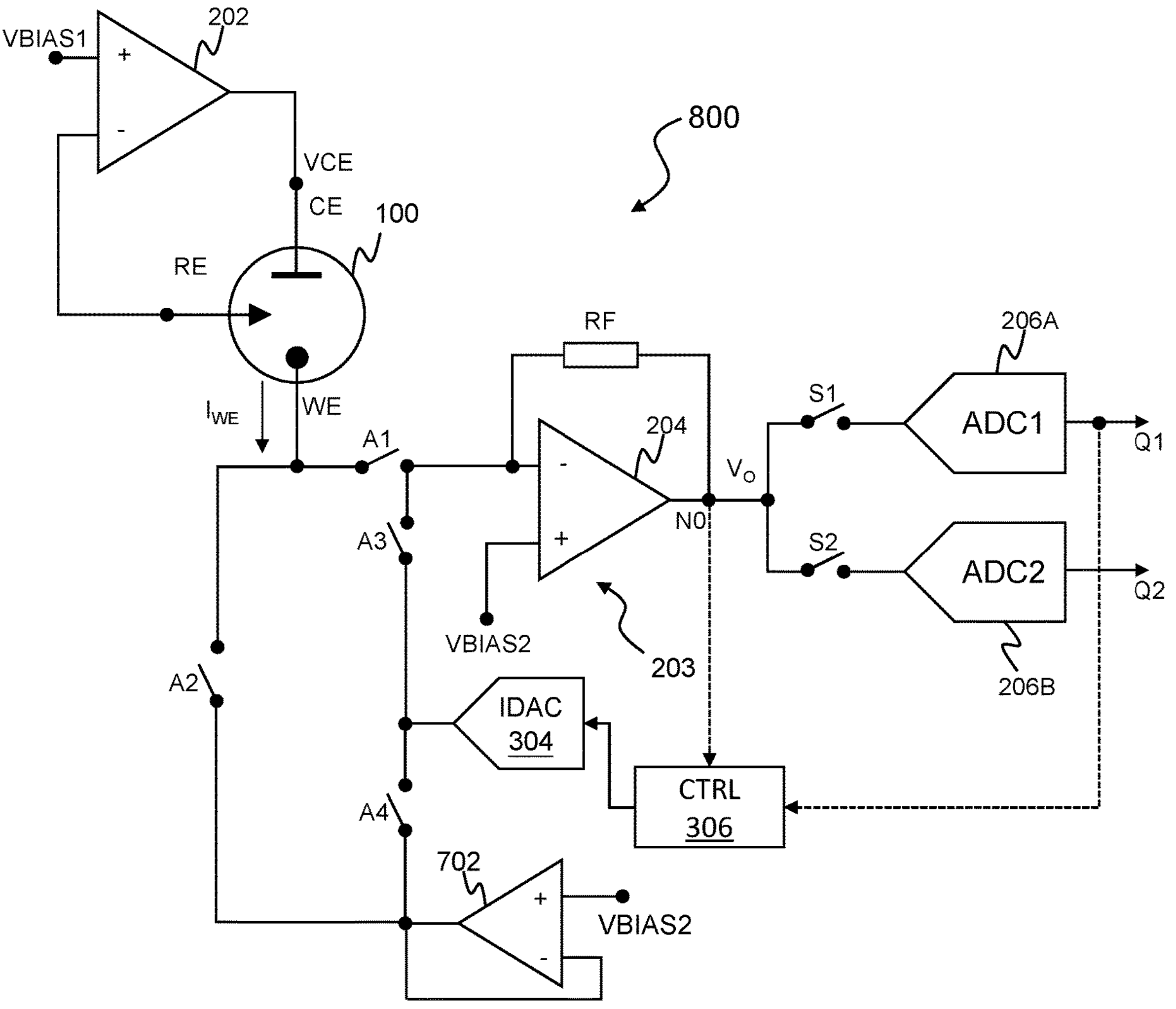
FIG. 8 illustrates an example drive and measurement circuit which is a variation of the drive and measurement circuit shown in FIG. 7.

FIG. 8 illustrates an example drive and measurement circuit 800 which is a variation of the drive and measurement circuit 700 shown in FIG. 7, like parts having been given like numbering. The circuit 800 shown in FIG. 8 differs from the circuit 700 of FIG. 7 with the addition of third and fourth autozero switches A3, A4. The third autozero switch A3 is coupled between an output of the IDAC 304 and the non-inverting input of the gain stage 203. The fourth autozero switch A4 is coupled between the output of the WE guard amplifier 702 and the output of the IDAC 304. As such, the IDAC 304 is switchably coupled to each of the non-inverting input of the gain stage 203 and the output of the WE guard amplifier 702.

Like the circuit 700, the circuit 800 shown in FIG. 8 may transition between a measurement mode and a calibration mode. In the measurement mode, the first and fourth autozero switches A1, A4 are closed and the second and third autozero switches A2, A3 are open. In this configuration, the working electrode WE is coupled to the gain stage 203 and decoupled from the WE guard amplifier 702. The IDAC 304 is coupled to the WE guard amplifier 702 and disconnected from the gain stage 203. In the calibration mode, the first and fourth autozero switches A1, A4 are open and the second and third autozero switches A2, A3 are closed. In this configuration, the working electrode WE is coupled to the WE guard amplifier 702 and disconnected from the gain stage 203. The IDAC 304 is coupled to the gain stage 203 and disconnected from the WE guard amplifier 702.

Prior to a transition from the measurement mode to the calibration mode, the IDAC 304 may be enabled, for example in response to a control signal from the control module 306. In doing so, the IDAC 304 may provide a current to the WE guard amplifier 702 which is substantially equal to the working electrode current IWE. This applied current from the IDAC 304 may cause a voltage transient at the output of the WE guard amplifier 702. However, since the second autozero switch A2 is open and the WE guard amplifier 702 is yet to be coupled to the working electrode WE, this transient this transient does not affect the voltage across the working electrode WE. When the circuit 800 then transitions to the calibration mode, the IDAC 304 is disconnected from the output of the WE guard amplifier 702 and the voltage at the output of WE guard amplifier 702 is substantially equal to the voltage at the working electrode WE. Thus, the bias voltage across the cell 100 is not disrupted by the transition to the calibration mode.

A similar charge balancing process may be performed prior to transitioning from the calibration mode to the measurement mode. In the calibration mode, the IDAC 304 is coupled to the non-inverting input of the gain stage 203. The IDAC 304 may be enabled, for example in response to a control signal from the control module 306. In doing so, the IDAC 304 may provide a current to the gain stage 203 which is substantially equal to the working electrode current IWE. This applied current from the IDAC 304 may cause a voltage transient at the non-inverting input of the gain stage 203. However, since the first autozero switch A1 is open and the gain stage 203 is not coupled to the working electrode WE, this transient does not affect the voltage across the working electrode WE. When the circuit 800 then transitions to the calibration mode, the IDAC 304 is disconnected from the gain stage 203 and the voltage at the non-inverting input of the gain stage 203 is pre-set to be substantially equal to the voltage at the working electrode WE. Thus, the bias voltage across the cell 100 is not disrupted by the transition to the measurement mode.

It will be appreciated that the duration of activation of the IDAC 304 prior to a transition between measurement and autozeroing modes will depend on the time taken for the voltages at the gain stage 203 and WE guard amplifier 702 to stabilize. In some embodiments, where power consumption is not limited, the IDAC 304 may be run continuously.

In another example, a duplicate output stage to each of the gain stage 203 and the WE guard amplifier 702 may be provided, and these duplicate output stages used to pre-load whichever of the gain stage 203 and WE guard amplifier 702 is not sinking the working electrode current IWE prior to transitioning between measurement and autozeroing modes.

Figure 9:
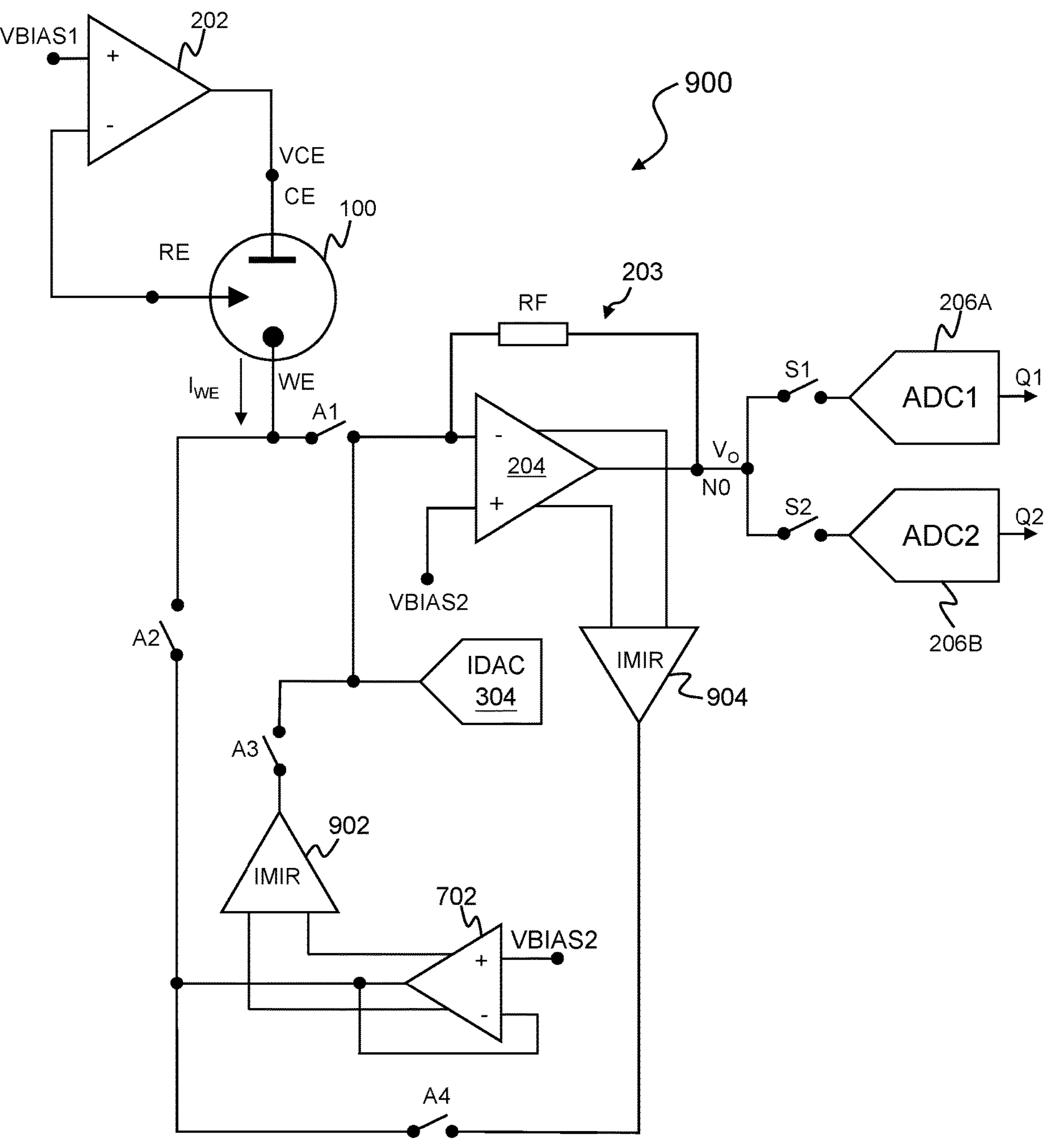
FIG. 9 illustrates another example drive and measurement circuit which is a variation of the drive and measurement circuit shown in FIG. 7.

FIG. 9 illustrates an example drive and measurement circuit 900 which is a variation of the drive and measurement circuit 700 shown in FIG. 7, like parts having been given like numbering. The circuit 900 shown in FIG. 9 differs from the circuit 700 of FIG. 7 with the addition of third and fourth autozero switches A3, A4 and first and second current mirrors 902, 904. The first current mirror 902 forms a duplicate output stage of the WE guard amplifier 702. An output of the first current mirror 902 is coupled to the non-inverting input of the gain stage 203 via a third autozero switch A3. The second current mirror 904 forms a duplicate output stage of the gain stage 204. An output of the second current mirror 904 is coupled to the output of the WE guard amplifier 702 by a fourth autozero switch A4.

In the measurement mode, the first and fourth autozero switches A1, A4 are closed and the second and third autozero switches A2, A3 are open. In this configuration, the working electrode WE is coupled to the gain stage 203 and decoupled from the WE guard amplifier 702. The second current mirror 904 is coupled to the output of the WE guard amplifier 702. Thus, the second current mirror 904 acts to pre-load the output of the WE guard amplifier 702 such that on transition to the calibration mode, the WE guard amplifier 702 is sinking the same current as the gain stage 203. In the calibration mode, the first and fourth autozero switches A1, A4 are open and the second and third autozero switches A2, A3 are closed. In this configuration, the working electrode WE is coupled to the WE guard amplifier 702 and disconnected from the gain stage 203. The first current mirror 902 is coupled to the gain stage 203. Thus, the first current mirror 902 acts to pre-load the non-inverting input of the gain stage 203 such that on transition to the measurement mode, the gain stage 203 is sinking the same current as the WE guard amplifier 702.

The configurations shown in FIGS. 8 and 9 allow for regular nulling of DC offset in the signal path (which may vary over long measurement periods) without causing undesirable transients in the bias voltage across the cell 100. This may be particularly advantageous when the cell 100 comprises a potentiostat configured to measure cell characteristics using electrochemical amperometry, given the sensitivities of such techniques to DC offset and disruption of cell voltage bias.

In the embodiments described herein, the electrochemical cells 100, 502 have been described in the form of an electrochemical sensor comprising counter and working electrodes CE, WE. For such sensors, the stimulus is typically a voltage, and the measured response is a current. It will be appreciated that embodiments of the present disclosure are not limited to such cells and extend to other types of cells, such as electrochemical cells acting as a power source (i.e. a battery). For batteries and the like, the driving stimulus of the cell is typically a current, and the measured response a voltage.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. Circuitry for processing an analyte signal obtained from an electrochemical cell, the circuitry comprising:

measurement circuitry having a first input coupled to a first electrode of the electrochemical cell, the measurement circuitry configured to convert the analyte signal at the first electrode to a first analog output signal;

a first analog-to-digital converter (ADC) having a first ADC input for receiving the first analog output signal, the first ADC configured to convert the first analog output signal to a first digital output signal at a first ADC output;

drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, wherein, in the measurement mode, the drive circuitry is configured to apply an offset signal at the first input of the measurement circuitry, the control circuitry configured to control the offset signal to maintain the first analog output signal or the first digital output signal within a threshold range, and wherein the control circuitry is configured to monitor the analog output signal or the digital output signal and control the offset signal based on the analog output signal or the digital output signal.

2. Circuitry of claim 1, wherein the measurement circuitry comprises a transimpedance amplifier.

3. Circuitry of claim 2, wherein the transimpedance amplifier comprises:

a gain stage coupled between the first input and the first ADC; and a feedback resistor coupled between the first input and the first ADC.

4. Circuitry of claim 1, wherein the measurement circuitry comprises a current conveyer.

5. Circuitry of claim 1, further comprising:

a second ADC having a second ADC input, wherein the first ADC has a higher bandwidth than the second ADC.

6. Circuitry of claim 5, wherein the second ADC is configured to receive the first analog output signal at the second ADC input and convert the first analog output signal to a second digital output signal at a second ADC output, wherein the first ADC input and the second ADC input are switchably coupled to the measurement circuitry.

7. Circuitry of claim 5, wherein the second ADC is configured to convert the analyte signal at the first electrode to a second analog output signal, wherein the second ADC is configured to receive the second analog output signal and convert the second analog output signal to a second digital output signal at a second ADC output.

8. Circuitry of claim 1, wherein calibration of the measurement circuitry comprises adjusting a gain of the measurement circuitry.

9. Circuitry of claim 1, wherein calibration of the measurement circuitry comprises setting or adjusting the offset signal used in the measurement mode.

10. Circuitry of claim 1, wherein the calibration signal is swept over a range of amplitudes.

11. Circuitry of claim 1, wherein, in the measurement mode, the measurement circuitry is configured to apply a fixed gain to the analyte signal.

12. Circuitry of claim 1, wherein the drive circuitry comprises a digital-to-analog converter (DAC) having a DAC output coupled to the first input of the measurement circuitry.

13. Circuitry of claim 12, wherein the control circuitry is configured to control the offset signal in response to the analog output signal exceeding a value of a least significant bit (LSB) of the DAC.

14. Circuitry of claim 12, wherein the DAC is a current DAC and wherein the calibration signal is a calibration current.

15. Circuitry of claim 12, further comprising switching circuitry configured to selectively couple the first input of the measurement circuitry to the first electrode, the switching circuitry controllable by the control circuitry.

16. Circuitry of claim 15, wherein the drive circuitry further comprises a guard amplifier having a guard amplifier output, wherein during the calibration mode the switching circuitry is controllable by the control circuitry to selectively couple the first electrode to the guard amplifier output.

17. Circuitry of claim 16, wherein the switching circuitry is configured to selectively couple the DAC output to the first input of the measurement circuitry and to selectively couple the DAC output to the guard amplifier output.

18. Circuitry of claim 17, wherein:

during the calibration mode, the control circuitry is configured to control the switching circuitry to couple the DAC output to the first input of the measurement circuitry; and during the measurement mode, the control circuitry is configured to control the switching circuitry to couple the guard amplifier output to the first electrode.

19. Circuitry of claim 16, wherein the drive circuitry further comprises:

a first current mirror configured to mirror a first output current of the guard amplifier, the first current mirror having a first current mirror output selectively coupled to the DAC output via the switching circuitry; and a second current mirror configured to mirror a second output current of the measurement circuitry, the second current mirror having a second current mirror output selectively coupled to the guard amplifier output via the switching circuitry.

20. Circuitry of claim 19, wherein:

during the calibration mode, the control circuitry is configured to control the switching circuitry to couple the second current mirror output to the guard amplifier output; and during the measurement mode, the control circuitry is configured to control the switching circuitry to couple the first current mirror output to the DAC output.

21. A system comprising:

the circuitry of claim 1; and the electrochemical cell.

22. The system of claim 21, wherein:

the electrochemical cell comprises a counter electrode; and the first electrode is a first working electrode of the electrochemical cell.

23. The system of claim 21, wherein the electrochemical cell comprises an anode and a cathode, wherein the first electrode is the cathode.

24. An electronic device, comprising the circuitry of claim 1, wherein the electronic device comprises one of a continuous glucose monitor, a mobile computing device, a laptop computer, a tablet computer, a games console, a remote control device, a home automation controller or a domestic appliance, a toy, a robot, an audio player, a video player, a mobile telephone, and a smartphone.

25. Circuitry for processing an analyte signal obtained from an electrochemical cell, the circuitry comprising:

measurement circuitry having a first input coupled to a first electrode of the electrochemical cell, the measurement circuitry configured to convert the analyte signal at the first electrode to a first analog output signal;

a first analog-to-digital converter (ADC) having a first ADC input for receiving the first analog output signal, the first ADC configured to convert the first analog output signal to a first digital output signal at a first ADC output;

a second ADC having a second ADC input, wherein the first ADC has a higher bandwidth than the second ADC;

drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, and wherein, in the measurement mode, the drive circuitry is configured to apply an offset signal at the first input of the measurement circuitry, the control circuitry configured to control the offset signal to maintain the first analog output signal or the first digital output signal within a threshold range.

26. Circuitry for processing an analyte signal obtained from an electrochemical cell, the circuitry comprising:

measurement circuitry having a first input coupled to a first electrode of the electrochemical cell, the measurement circuitry configured to convert the analyte signal at the first electrode to a first analog output signal;

a first analog-to-digital converter (ADC) having a first ADC input for receiving the first analog output signal, the first ADC configured to convert the first analog output signal to a first digital output signal at a first ADC output;

drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, wherein, in the measurement mode, the drive circuitry is configured to apply an offset signal at the first input of the measurement circuitry, the control circuitry configured to control the offset signal to maintain the first analog output signal or the first digital output signal within a threshold range, and wherein the calibration signal is swept over a range of amplitudes.

27. Circuitry for processing an analyte signal obtained from an electrochemical cell, the circuitry comprising:

measurement circuitry having a first input coupled to a first electrode of the electrochemical cell, the measurement circuitry configured to convert the analyte signal at the first electrode to a first analog output signal;

a first analog-to-digital converter (ADC) having a first ADC input for receiving the first analog output signal, the first ADC configured to convert the first analog output signal to a first digital output signal at a first ADC output;

drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, wherein, in the measurement mode, the drive circuitry is configured to apply an offset signal at the first input of the measurement circuitry, the control circuitry configured to control the offset signal to maintain the first analog output signal or the first digital output signal within a threshold range, wherein the drive circuitry comprises a digital-to-analog converter (DAC) having a DAC output coupled to the first input of the measurement circuitry, and wherein the control circuitry is configured to control the offset signal in response to the analog output signal exceeding the value of a least significant bit (LSB) of the DAC.

28. Circuitry for processing an analyte signal obtained from an electrochemical cell, the circuitry comprising:

measurement circuitry having a first input coupled to a first electrode of the electrochemical cell, the measurement circuitry configured to convert the analyte signal at the first electrode to a first analog output signal;

a first analog-to-digital converter (ADC) having a first ADC input for receiving the first analog output signal, the first ADC configured to convert the first analog output signal to a first digital output signal at a first ADC output;

drive circuitry; and control circuitry, wherein the circuitry is operable in one or more of a calibration mode and a measurement mode, wherein, in the calibration mode, the drive circuitry is configured to apply a calibration signal at the first input of the measurement circuitry, the control circuitry configured to calibrate the measurement circuitry based on the first analog output signal or the first digital output signal responsive to the calibration signal, wherein, in the measurement mode, the drive circuitry is configured to apply an offset signal at the first input of the measurement circuitry, the control circuitry configured to control the offset signal to maintain the first analog output signal or the first digital output signal within a threshold range, wherein the drive circuitry comprises a digital-to-analog converter (DAC) having a DAC output coupled to the first input of the measurement circuitry, wherein the circuitry further comprises switching circuitry configured to selectively couple the first input of the measurement circuitry to the first electrode, the switching circuitry controllable by the control circuitry, and wherein the drive circuitry further comprises a guard amplifier having a guard amplifier output, wherein during the calibration mode the switching circuitry is controllable by the control circuitry to selectively couple the first electrode to the guard amplifier output.

* * * * *